US 11,668,400 B2

(12) United States Patent
Stern et al.

(10) Patent No.: US 11,668,400 B2
(45) Date of Patent: Jun. 6, 2023

(54) INTEGRATED EQUALIZATION VALVE

(71) Applicant: Mueller International, LLC, Atlanta, GA (US)

(72) Inventors: Timothy Wayne Stern, Hixson, TN (US); Rock Allen Powell, Jr., Mt. Zion, IL (US); Mohammad Unnus Qasim, Decatur, IL (US)

(73) Assignee: Mueller International, LLC, Atlanta, GA (US)

( * ) Notice: Subject to any disclaimer, the term of this patent is extended or adjusted under 35 U.S.C. 154(b) by 0 days.

(21) Appl. No.: 17/746,365

(22) Filed: May 17, 2022

(65) Prior Publication Data

US 2022/0275869 A1 Sep. 1, 2022

Related U.S. Application Data

(63) Continuation of application No. 17/092,828, filed on Nov. 9, 2020, now Pat. No. 11,359,727.

(51) Int. Cl.
| | | |
|---|---|---|
| *F16K 3/02* | (2006.01) | |
| *F16K 39/04* | (2006.01) | |
| *F16K 3/30* | (2006.01) | |

(52) U.S. Cl.
CPC ............ *F16K 3/0227* (2013.01); *F16K 39/04* (2013.01); *F16K 3/30* (2013.01)

(58) Field of Classification Search
CPC .... F16K 3/0209; F16K 3/0227; F16K 3/0254; F16K 3/314; F16K 3/34; F16K 39/04; F16K 2200/401
See application file for complete search history.

(56) References Cited

U.S. PATENT DOCUMENTS

| | | |
|---|---|---|
| 588,430 A | 8/1897 | Hirt |
| 745,774 A | 12/1908 | Brady |
| 1,549,609 A | 8/1925 | Redding |
| (Continued) | | |

FOREIGN PATENT DOCUMENTS

| | | |
|---|---|---|
| DE | 553249 | 6/1932 |
| DE | 681510 | 9/1939 |
| GB | 743213 | 1/1956 |

OTHER PUBLICATIONS

Stern, Timothy Wayne; Non-Final Office Action for U.S. Appl. No. 17/092,828, filed Nov. 9, 2020, dated Oct. 7, 2021, 17 pgs.

(Continued)

*Primary Examiner* — Hailey K. Do
(74) *Attorney, Agent, or Firm* — Taylor English Duma LLP

(57) ABSTRACT

An equalization valve includes a valve body defining a gate slot; a gate defining an equalization chamber, a first equalization channel, and a second equalization channel, the equalization chamber and the first and second equalization channels defining an equalization pathway across the gate; and an actuation stem slidable within the equalization chamber between a first chamber position, wherein the actuation stem blocks the equalization pathway, and a second chamber position, wherein the actuation stem unblocks the equalization pathway; wherein the actuation stem is further slidable within the gate slot of the valve body between a first valve position, wherein the gate is seated with the valve body, and a second valve position, wherein the gate is unseated from the valve body.

17 Claims, 9 Drawing Sheets

(56) References Cited

U.S. PATENT DOCUMENTS

| | | | |
|---|---|---|---|
| 1,932,471 A | | 10/1933 | McKellar |
| 4,678,008 A | | 7/1987 | Gyongyossy |
| 5,370,155 A | * | 12/1994 | Gyongyossy ........... F16K 39/04 137/630.12 |
| 8,302,630 B2 | * | 11/2012 | Palmer .................... F16K 3/029 137/625.42 |
| 9,395,002 B2 | | 7/2016 | McEvoy et al. |
| 11,359,727 B2 | | 6/2022 | Stern et al. |
| 2022/0145998 A1 | | 5/2022 | Stern et al. |

OTHER PUBLICATIONS

Stern, Timothy Wayne; Notice of Allowance for U.S. Appl. No. 17/092,828, filed Nov. 9, 2020, dated Feb. 14, 2022, 7 pgs.

* cited by examiner

INTEGRATED EQUALIZATION VALVE

CROSS-REFERENCE TO RELATED APPLICATIONS

The present application is a continuation of U.S. application Ser. No. 17/092,828, filed Nov. 9, 2020, which is hereby specifically incorporated by reference herein in its entirety.

TECHNICAL FIELD

This disclosure relates to piping systems. More specifically, this disclosure relates to an equalization valve that is integrated with a flow valve.

BACKGROUND

Flow valves, such as gate valves, are utilized in piping systems to selectively allow or prohibit gas or fluid to flow through the flow valve. When a large pressure differential is present across the flow valve, it can be difficult to open and close the flow and damage may occur to the flow valve during operation. An equalization valve may be provided to assist in equalizing the pressure across the flow valve prior to operation of the flow valve. Typically, the equalization valve is oriented outside of the flow valve, and the external orientation can leave the equalization valve vulnerable to damage during transportation and/or operation. Furthermore, the equalization valve is typically operated separately from the flow valve, which can be time-consuming and adds extra steps to the overall operation of the flow valve.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts of the disclosure as an introduction to the following complete and extensive detailed description.

Disclosed is an equalization valve comprising a gate defining a first face, a second face, and a sidewall extending between the first face and second face, the gate further defining an equalization chamber extending into the sidewall, a first equalization channel extending from the first face to the equalization chamber, and a second equalization channel extending from the second face to the equalization chamber; and an actuation stem defining a lower portion slidably engaged with the equalization chamber, the actuation stem movable between a first position, wherein the actuation stem blocks the first equalization channel to prevent the flow of one of gas and fluid through the equalization valve, and a second position, wherein the actuation stem unblocks the first equalization channel to allow the flow of the one of gas and fluid through the equalization valve.

Also disclosed is a valve assembly comprising a valve body defining a valve channel and a gate slot; a gate slidably received within the gate slot, the gate defining an equalization pathway, the gate movable between a lowered orientation, wherein the gate blocks the valve channel to prevent the flow of one of gas and fluid through the valve channel, and a raised orientation, wherein the gate unblocks the valve channel to allow the one of gas and fluid to flow through the valve channel; and an actuation stem engaging the gate and moveable between a first position, wherein the actuation stem blocks the equalization pathway to prevent the flow of the one of gas and fluid therethrough, and a second position, wherein the actuation stem unblocks the equalization pathway to allow the flow of the one of gas and fluid therethrough; wherein the gate is in the lowered orientation when the actuation stem is in the first and second positions, and wherein the actuation stem is further movable to a third position, wherein the gate is in the raised orientation.

Also disclosed is a method of operating a valve assembly, the method comprising providing the valve assembly comprising a valve body, a gate, and an actuation stem coupled to the gate, the valve body defining a valve channel and a gate slot, the gate defining an equalization pathway; moving the actuation stem from a first position to a second position within an equalization chamber of the gate, wherein, in the first position, the equalization pathway is blocked by the actuation stem, and in the second position, the equalization pathway is unblocked; and moving the actuation stem from the second position to a third position relative to the valve body, wherein, in the second position, the gate is in a lowered orientation within the gate slot and the valve channel is blocked by the gate, and in the third position, the gate is in a raised orientation within the gate slot and the valve channel is unblocked.

An equalization valve is disclosed, the equalization valve comprising a valve body defining a gate slot; a gate defining an equalization chamber, a first equalization channel, and a second equalization channel, the equalization chamber and the first and second equalization channels defining an equalization pathway across the gate; and an actuation stem slidable within the equalization chamber between a first chamber position, wherein the actuation stem blocks the equalization pathway, and a second chamber position, wherein the actuation stem unblocks the equalization pathway; wherein the actuation stem is further slidable within the gate slot of the valve body between a first valve position, wherein the gate is seated with the valve body, and a second valve position, wherein the gate is unseated from the valve body.

Additionally, a method of operating a valve assembly is disclosed, the method comprising providing the valve assembly comprising a valve body, a gate, and an actuation stem coupled to the gate, the valve body defining a gate slot, the gate defining an equalization pathway; moving the actuation stem from a first chamber position to a second chamber position within an equalization chamber of the gate, wherein, in the first chamber position, the equalization pathway is blocked by the actuation stem, and in the second chamber position, the equalization pathway is unblocked; and moving the actuation stem from a first valve position to a second valve position within the gate slot, wherein, in the first valve position, the gate is seated with the valve body, and in the second valve position, the gate is unseated from the valve body.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Figure 1:
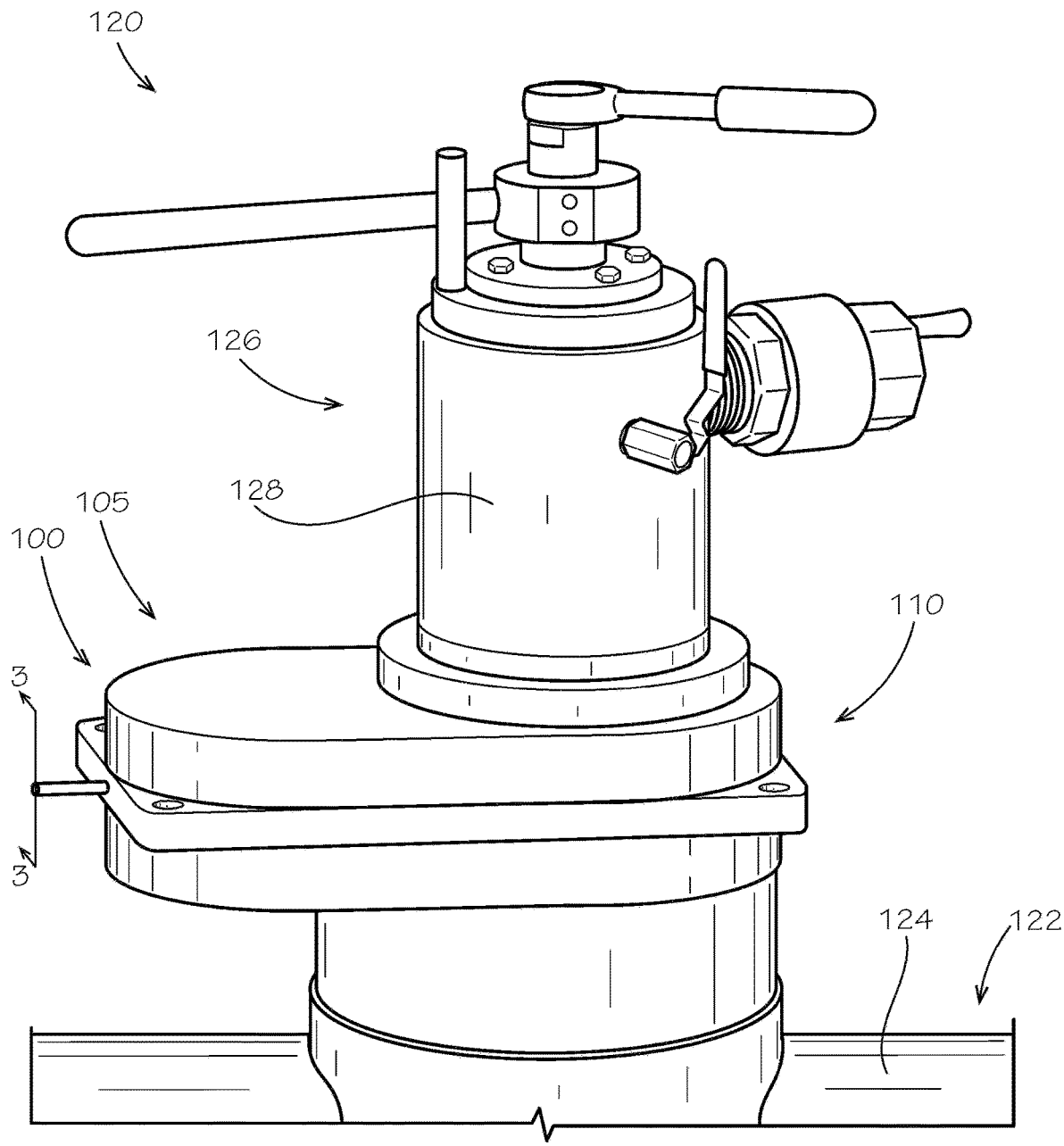
FIG. 1 is a perspective view of a valve assembly assembled with a piping system, in accordance with one aspect of the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutations of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is a valve assembly and associated methods, systems, devices, and various apparatus. Example aspects of the valve assembly can comprise an equalization valve integrated with a flow valve. In some aspects, the flow valve can be a gate valve. It would be understood by one of skill in the art that the valve assembly is described in but a few exemplary embodiments among many. No particular terminology or description should be considered limiting on the disclosure or the scope of any claims issuing therefrom.

FIG. 1 illustrates a perspective view of a valve assembly 100, according to the present disclosure. Example aspects of the valve assembly 100 can comprise a flow valve 105, such as a gate valve 110, as shown. The valve assembly 100 can be attached, connected, or otherwise mounted to a piping system 120. The piping system 120 can be configured to transport gas or liquids therethrough. In example aspects, the valve assembly 100 can be positioned between a first piping element 122 and a second piping element 126 to selectively allow or prohibit the flow of one of gas and fluid therebetween. For example, in the present aspect, the first piping element 122 can be a pipeline 124 and the second piping element 126 can be a stopping machine 128. The valve assembly 100 can be oriented between the pipeline 124 and the stopping machine 128 and can selectively allow or prohibit gas (or fluid in other aspects) to flow from the pipeline 124, through the valve assembly 100, and into the stopping machine 128, as will be described in further detail below.

Figure 2:
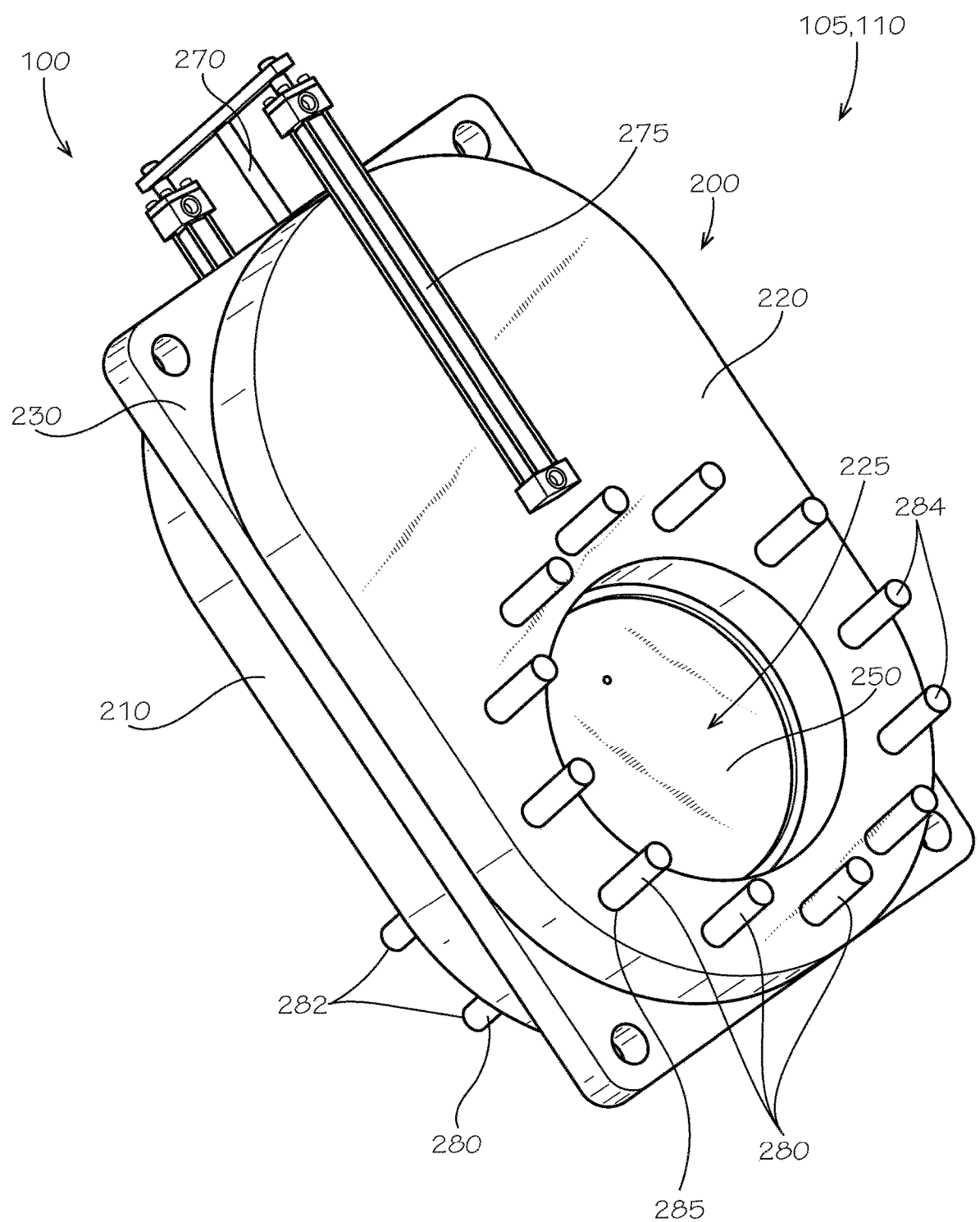
FIG. 2 is a perspective view of the valve assembly of FIG. 1, the valve assembly comprising a gate valve and an equalization valve, wherein the gate valve is in a closed configuration.
Figure 10:
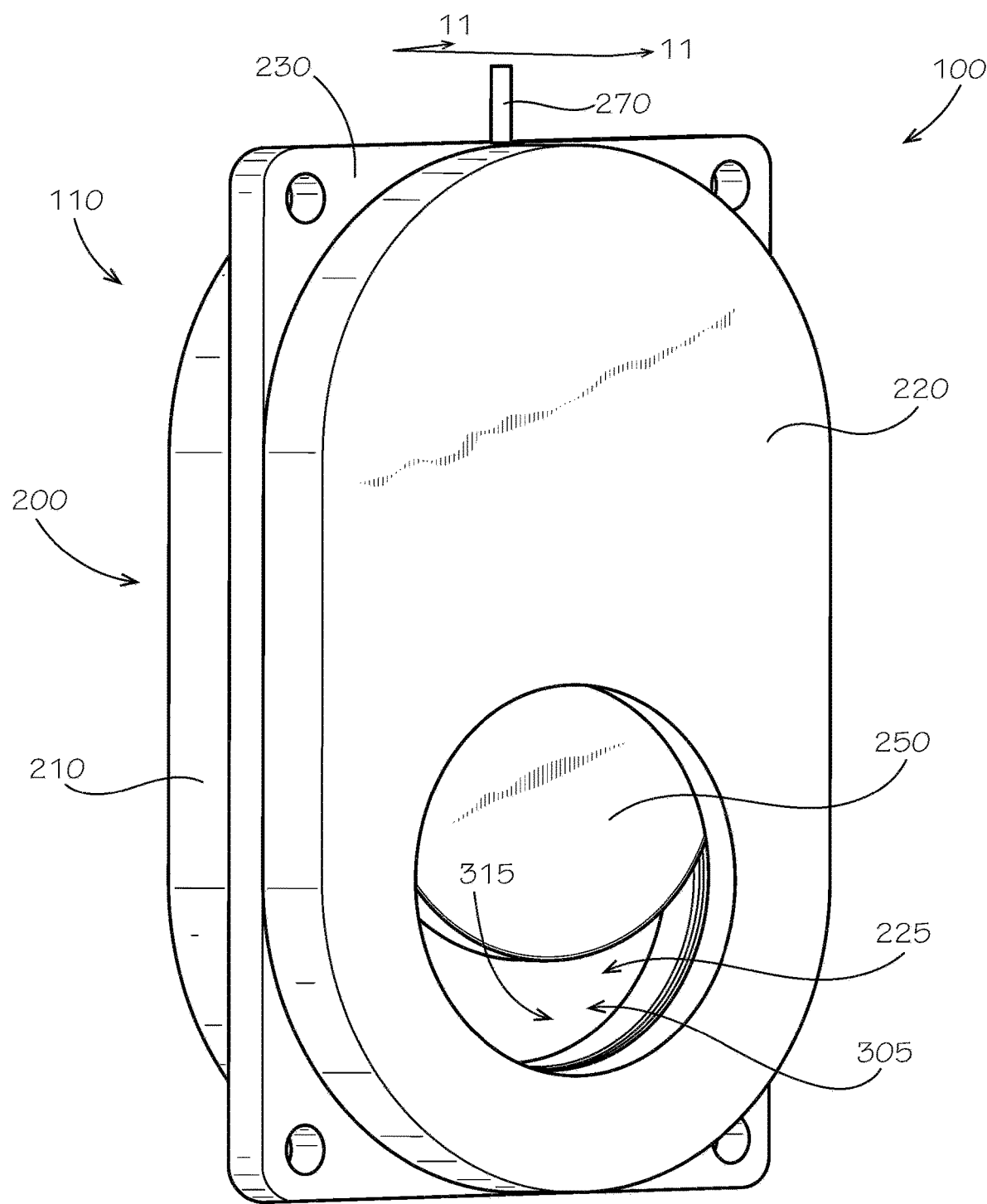
FIG. 10 is a perspective view of the valve assembly of FIG. 1, wherein the gate valve 110 is in an open configuration.

FIG. 2 illustrates a rear perspective view of the valve assembly 100 removed from the piping system 120 (shown in FIG. 1). Example aspects of the gate valve 110 can be selectively configured in a closed configuration, as shown, wherein the gas can be prevented from flowing through the valve assembly 100, and an open configuration, as shown in FIG. 10, wherein the gas can be permitted to flow through the valve assembly 100. Example aspects of the valve assembly 100 can comprise a valve body 200. The valve body 200 can comprise an inlet body 210, an outlet body 220, and a central body 230 oriented between the inlet and outlet bodies 210, 220. In the present aspect, the inlet body 210, outlet body 220, and central body 230 can be formed separately; however, in other aspects, the inlet body 210, outlet body 220, and central body 230 can be monolithically formed (i.e., formed as a single component). The inlet body 210, outlet body 220, and central body 230 can be coupled together by one or more fasteners, such as, for example, adhesives, welding, mechanical fasteners, or any other suitable fastener known in the art. According to example aspects, the valve body 200 (i.e., the inlet body 210, outlet body 220, and central body 230) can be formed from a metal material, such as, for example, steel. In a particular aspect, the valve body 200 can be formed from stainless steel. Other example aspects of the valve body 200 can be formed from another metal material, such as, iron, such as cast iron, and more specifically, ductile iron in some aspects, aluminum, or bronze, or any other suitable metal material or combination of metal materials. Other example aspects of the valve body 200 can be formed from a non-metal material, such as plastic, composites, or any other suitable non-metal material or combination of non-metal materials. Still other aspects of the valve body 200 may comprise a combination of metal and non-metal materials.

According to example aspects, the valve assembly 100 can be mounted to the piping system 120 by any suitable fastener(s) known in the art, including, adhesives, welding, mechanical fasteners, and the like. For example, in the present aspect, the valve assembly 100 can comprise a plurality of mounting bolts 280 for mounting the valve assembly 100 to the piping system 120. As shown, a plurality of bolt holes 285 can be formed through the valve assembly 100, extending through the inlet body 210, central body 230, and outlet body 220. Each of the mounting bolts 280 can be received through a corresponding one of the bolt holes 285. A first end 282 of each mounting bolt 280 can extend outward from the inlet body 210 and an opposite second end 284 of each mounting bolt 280 can extend outward from the outlet body 220. The first end 282 of each mounting bolt 280 can be configured to engage a corresponding bolt recess formed in the first piping element 122 (shown in FIG. 1), e.g., the pipeline 124 (shown in FIG. 1), to couple the valve assembly 100 to the first piping element 122. Similarly, the second end 284 of each mounting bolt 280 can be configured to engage a corresponding bolt recess formed in the second piping element 126 (shown in FIG. 1), e.g., the stopping machine 128 (shown in FIG. 1), to couple the valve assembly 100 to the second piping element 126. In some aspects, the mounting bolts 280 may further serve to secure the inlet body 210, central body 230, and outlet body 220 together.

An inlet passage 315 (shown in FIG. 3) can be formed through the inlet body 210 and an outlet passage 225 can be formed through the outlet body 220. Furthermore, a gate slot 335 (shown in FIG. 3) can be formed through the central body 230. According to example aspects, the valve assembly 100 can also comprise a sliding gate 250 slidably received within the gate slot 335 between the inlet body 210 and the outlet body 220. In example aspects, the sliding gate 250 can comprise a metal material, such as an aluminum alloy. Other aspects of the sliding gate 250 can comprise any other suitable metal or non-metal material, including, but not limited to, steel, iron, bronze, plastic, composites, or any other suitable material or combination of materials. In the closed configuration, the sliding gate 250 can be positioned in a lowered orientation within the gate slot 335, as shown, to prohibit the gas from flowing from the inlet passage 315 to the outlet passage 225 (or vice versa). In the open configuration, the sliding gate 250 can be positioned in a raised orientation within the gate slot 335, as shown in FIG. 10, to allow the gas to flow from the inlet passage 315 to the outlet passage 225 (or vice versa).

In the present aspect, an actuation stem 270 coupled to the sliding gate 250 can be provided for controlling movement of the sliding gate 250 between the lowered and raised orientations. Example aspects of the actuation stem 270 can be formed from a metal material, such as, for example, bronze. In other aspects, the actuation stem 270 can be formed from any suitable metal or non-metal material, such as iron, steel, aluminum, plastics, composites, or any suitable combination of materials. An actuator 275 can be coupled to the actuation stem 270, and the actuator 275 can be configured to actuate the movement of the actuation stem 270 between various positions, as described in further detail below. In the present aspect, the actuator 275 can be a hydraulic actuator 275. In some aspects, such as the present aspect, the actuation stem 270 can undergo substantially linear movement as it is actuated between the various positions, while in other aspects, the actuation stem 270 may undergo rotational movement.

Figure 3:
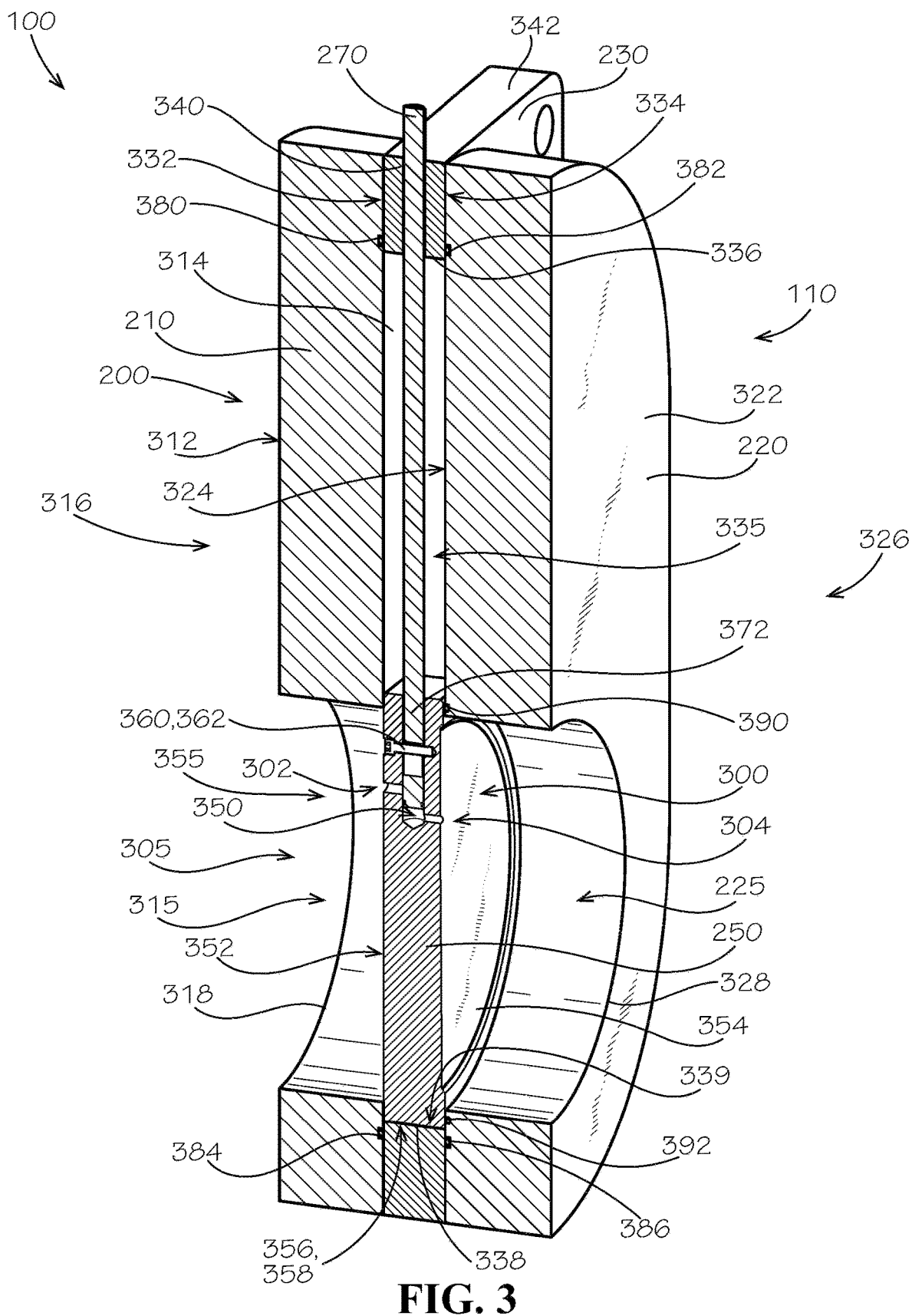
FIG. 3 is a cross-sectional view of the valve assembly of FIG. 1 taken along line 3-3 in FIG. 1.

FIG. 3 illustrates a cross-sectional view of the valve assembly 100 taken along line 1-1 in FIG. 1. According to example aspects, each of the inlet body 210, outlet body 220, and central body 230 can define an outer surface 312,322, 332 and an inner surface 314,324,334, respectively. The central body 230 can be received between the inlet body 210 and outlet body 220, such that the inner surface 314 of the inlet body 210 can confront the outer surface 334 of the central body 230 and the inner surface 324 of the outlet body 220 can confront the inner surface 334 of central body 230, as shown. In some aspects, as shown, a first packing 380 can extend around the gate slot 335 between the central body 230 and inlet body 210 to create an airtight seal between the central body 230 and the inlet body 210. Similarly, a second packing 382 can extend around the gate slot 335 between the central body 230 and in the outlet body 220 to create an airtight seal between the central body 230 and the outlet body 220. The first and second packings 380,382 can be elongated O-rings in some example aspects, and in other aspects, the first and second packings 380,382 can be any other suitable packing known in the art. In the present aspect, the first and second packings 380,382 can be received in first and second grooves 384,386 formed in the inlet body 210 and outlet body 220, respectively.

According to example aspects, each of the inlet passage 315, outlet passage 225, and gate slot 335 can extend from the outer surface 312,322,332 to the inner surface 314,324, 334 of the corresponding inlet body 210, outlet body 220, and central body 230, respectively. The outer surface 312 of the inlet body 210 can generally define an inlet end 316 of the valve assembly 100, and an inlet opening 318 can be formed at the outer surface 312 of the inlet body 210 to allow access to the inlet passage 315. Similarly, the outer surface 322 of the outlet body 220 can generally define an outlet end 326 of the valve assembly 100, and an outlet opening 328 can be formed at the outer surface 322 of the outlet body 220 to allow access to the outlet passage 225. The inlet passage 315, outlet passage 225, and gate slot 335 can together define a valve channel 305 formed through the valve body 200 through which gas can pass when the gate valve 110 is in the open configuration. In normal operation, gas can flow through the valve channel 305 from the inlet end 316 to the outlet end 326, though in some instances, gas can also or alternatively flow in the reverse direction. As shown, in the closed configuration, the sliding gate 250 can be oriented between the inlet passage 315 and outlet passage 225 and can be configured to seal the inlet and outlet passages 315,225 off from one another, thus prohibiting gas from flowing through the valve channel 305.

In the present aspect, each of the inlet passage 315 and outlet passage 225 can define a substantially circular cross-section and can be about equal in diameter, as shown. The sliding gate 250 can also define a substantially circular cross-section, and can define a diameter that can be larger than the diameter of the inlet and outlet passages 315,225. Thus, in the closed configuration, the sliding gate 250 can completely block each of the inlet and outlet passages 315,225 to prohibit gas flow therebetween. Moreover, in example aspects, the gate slot 335 within which the sliding gate 250 is slidably received can define an elongate shape having a length that can be greater than the diameter of the sliding gate 250. The gate slot 335 can generally define an upper gate slot end 336 and a lower gate slot end 338, relative to the orientation shown. The sliding gate 250 can be selectively moved within the gate slot 335 along the length thereof between the raised orientation (i.e., moved towards the upper gate slot end 336) and lowered orientation (i.e., moved towards the lower gate slot end 338). As shown, the actuation stem 270 can extend through a central stem channel 340 formed at an upper end 342 of the central body 230. The actuation stem 270 can further extend into the gate slot 335 at the upper gate slot end 336 thereof and can engage the sliding gate 250 received therein. In the present aspect, a lower portion 372 of the actuation stem 270 can extend into an equalization chamber 350 of the sliding gate 250 and can be secured to the sliding gate 250 by a gate fastener 360. The gate fastener 360 can be a threaded bolt 362 in the present aspect. In other aspects, the gate fastener 360 can be any other suitable fastener known in the art, including, but not limited to, a screw, pin, rivet, or the like.

Example aspects of the sliding gate 250 can be substantially disk-shaped. As shown, in example aspects, the sliding gate 250 can define a substantially circular first face, such as an inlet face 352, a substantially circular second face, such as an outlet face 354 opposite the inlet face 352, and a substantially cylindrical gate sidewall 356 extending therebetween. The equalization chamber 350 can extend into the gate sidewall 356, such that the equalization chamber 350 is oriented between the inlet and outlet faces 352,354. In example aspects, the sliding gate 250 can be configured to seat with the valve body 200 in the lowered orientation. For example, the gate sidewall 356 can define a gate seating surface 358 configured to seat with a slot seating surface 339 defined by the gate slot 335 in the lowered orientation. Example aspects of the slot seating surface 339 can generally be defined at the lower gate slot end 338 of the gate slot 335. A seal can be formed between the gate seating surface 358 and the slot seating surface 339 in the lowered orientation to prevent gas from passing through the valve channel 305 from the inlet passage 315 to the outlet passage 225 (or vice versa). Furthermore, according to example aspects, the inlet face 352 of the sliding gate 250 can define an annular inlet seating portion 555 (shown in FIG. 5) configured to seat with the inner surface 314 of the inlet body 210 surrounding the inlet passage 315 when the sliding gate 250 is in the lowered orientation. The annular inlet seating portion 555 can be defined at or near an outer circumference 556 (shown in FIG. 5) of the inlet face 352. Similarly, the outlet face 354 of the sliding gate 250 can define an annular outlet seating portion 455 (shown in FIG. 4) configured to seat with the inner surface 324 of the outlet body 220 surrounding the outlet passage 225 in the lowered orientation. The annular outlet seating portion 455 can be defined at or near an outer circumference 456 (shown in FIG. 4) of the outlet face 354.

In some aspects, one or both of the outlet body 220 and inlet body 210 can comprise an annular gate packing 390 received in a corresponding annular gate packing groove 392. For example, in the present aspect, the outlet body 220 can define the gate packing groove 392 formed in the inner surface 324 thereof and extending around the outlet passage 225. In the present aspect, the gate packing 390 can be an O-ring, and in other aspects, the gate packing 390 can be any other suitable packing known in the art. The gate packing 390 can be received in the gate packing groove 392 and can be sandwiched between the inlet body 210 and the outlet seating portion 455 of the sliding gate 250 to create an airtight seal between the sliding gate 250 and the outlet body 220. The engagement of the inlet and outlet seating portions 555,455 of the sliding gate 250 with the inlet and outlet bodies 210,220, respectively, as well as the gate packing 390 received between the sliding gate 250 and the outlet body 220, can further prevent gas from passing through the valve channel 305. In other aspects, the gate packing groove(s) 392 may be formed in the inlet and/or outlet seating portions 555,455 of the sliding gate 250. Still other aspects may not comprise the gate packing(s) 390 and corresponding gate packing groove(s) 392, or may comprise additional gate packings 390 and gate packing grooves 392.

According to example aspects, the valve assembly 100 can comprise an equalization valve 300 integrated with the gate valve 110. In the present aspect, the equalization valve 300 can be formed with the sliding gate 250 and the actuation stem 270, and can be configured to equalize the pressure at the outlet end 326 and inlet end 316 of the valve assembly 100 prior to opening the gate valve 110. When a large pressure differential is present across the valve assembly 100, it can be difficult to open the gate valve 110 and/or damage may occur to the valve assembly 100 during operation of the gate valve 110. Thus, it can be desired to equalize the pressure across the valve assembly 100 to minimize or prevent such difficulty and/or damage. As shown, the sliding gate 250 can define a first equalization channel, such as an inlet equalization channel 302, and a second equalization channel, such as an outlet equalization channel 304, each of which can be in fluid communication with the equalization chamber 350. As such, the equalization chamber 350 and the inlet and outlet equalization channels 302,304 can define an equalization pathway 355 of the equalization valve 300 through the sliding gate 250.

Figure 9:
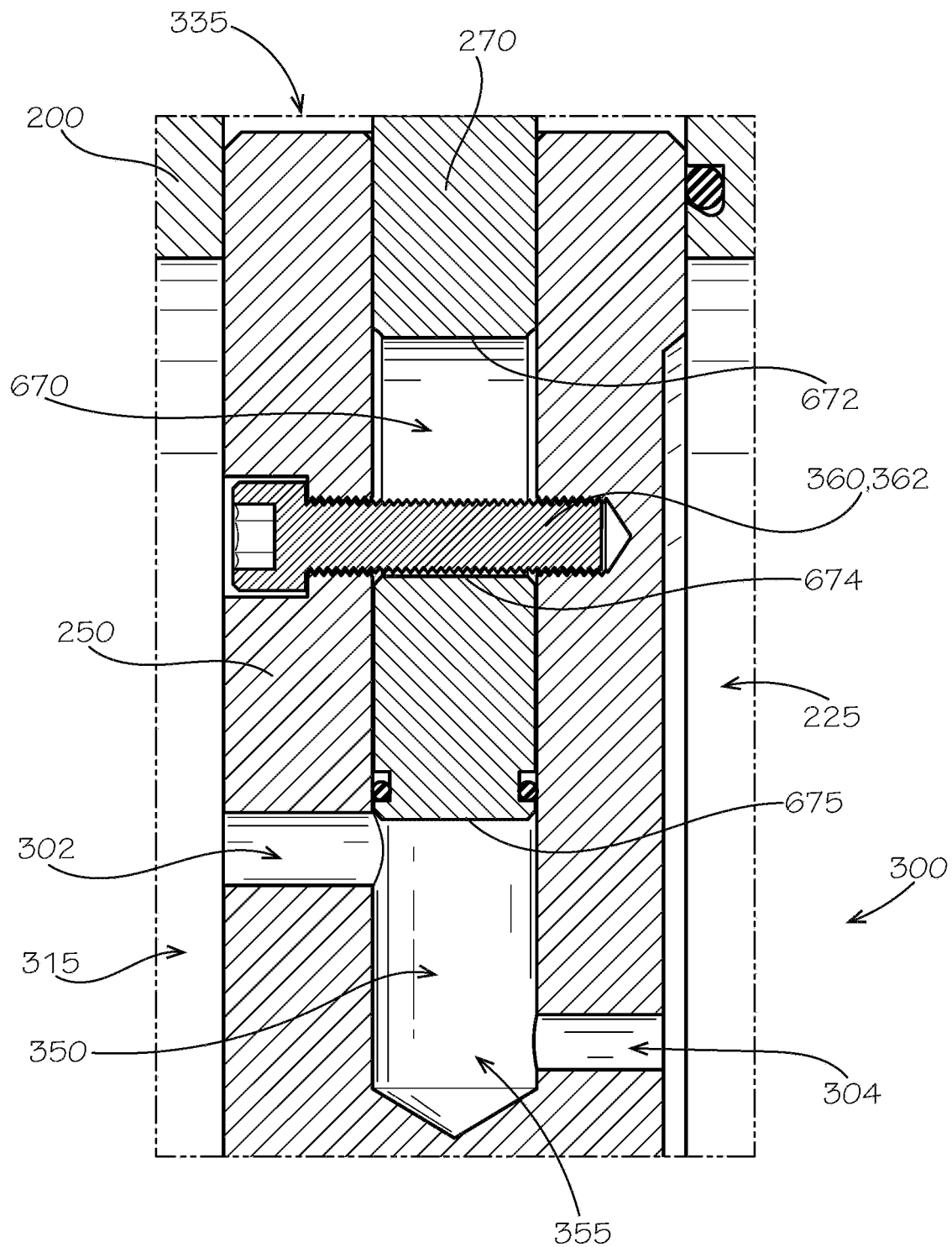
FIG. 9 is a close-up view of the equalization valve of FIG. 2 is in an open orientation.

The equalization valve 300 can be configured to selectively allow or prohibit a small amount of gas to flow through the sliding gate 250 by way of the equalization pathway 355. Example aspects of the actuation stem 270 can be moved between a first position and a second position within the equalization chamber 350. In the first position, as shown, the actuation stem 270 can be configured to block the equalization pathway 355, and in the second position, as shown in FIG. 9, the actuation stem 270 can unblock the equalization pathway 355. More specifically, in the present aspect, the actuation stem 270 can be configured to block the inlet equalization channel 302 in the first position to prevent gas from flowing therethrough, and the actuation stem 270 can unblock the inlet equalization channel 302 in the second position to allow gas to flow therethrough. In aspects wherein the pressure at the inlet passage 315 is greater than the pressure at the outlet passage 225, gas from the inlet passage 315 can flow into the inlet equalization channel 302, through the equalization chamber 350, and out of the outlet equalization channel 304 into the outlet passage 225. Thus, the pressure at the inlet passage 315 can be reduced and the pressure at the outlet passage 225 can be increased to equalize the pressure therebetween. Similarly, in aspects wherein the pressure at the outlet passage 225 is greater than the pressure at the inlet passage 315, gas from the outlet passage 225 can flow into the outlet equalization channel 304, through the equalization chamber 350, and out of the inlet equalization channel 302 into the inlet passage 315. Thus, the pressure at the outlet passage 225 can be reduced and the pressure at the inlet passage 315 can be increased to equalize the pressure therebetween. In some aspects, the equalization valve 300 can fully equalize the pressure across the valve assembly 100, while in other aspects, the equalization valve 300 may allow the pressure across the valve assembly 100 to become more equal, but not fully equal, prior to opening the gate valve 110.

Figure 4:
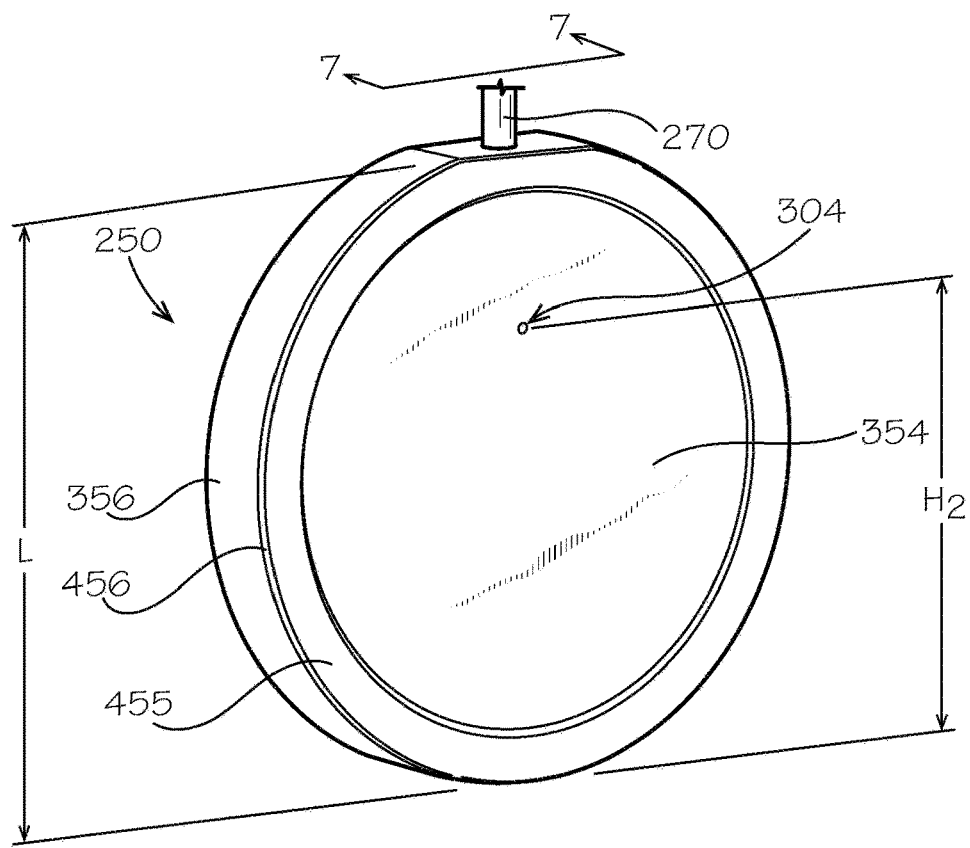
FIG. 4 is a front perspective view of a sliding gate of the valve assembly of FIG. 1.
Figure 5:
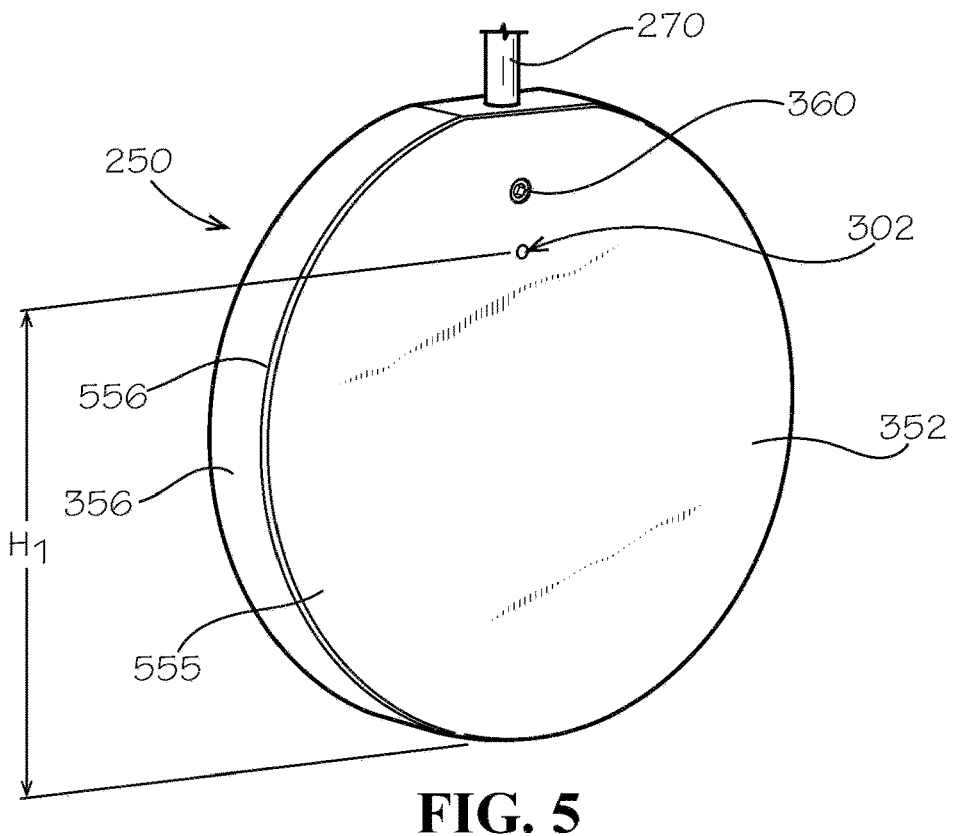
FIG. 5 is a rear perspective view of the sliding gate of FIG. 4.

FIGS. 4 and 5 illustrate rear and front perspective views, respectively, of the actuation stem 270 engaged with the sliding gate 250. Example aspects of the sliding gate 250 can define the outlet face 354, the opposite inlet face 352 (shown in FIG. 5), and the gate sidewall 356 extending therebetween. The outlet seating portion 455 of the outlet face 354 can be defined at or near the outer circumference 456 of the outlet face 354, proximate to the gate sidewall 356, and the inlet seating portion 555 (shown in FIG. 5) can be defined at or near the outer circumference 556 (shown in FIG. 5) of the inlet face 352, proximate to the gate sidewall 356. According to example aspects, the sliding gate 250 can define the outlet equalization channel 304 extending from the outlet face 354 to the equalization chamber 350 (shown in FIG. 3). Referring to FIG. 5, the sliding gate 250 can also define the inlet equalization channel 302 extending from the inlet face 352 to the equalization chamber 350. In the present aspect, the inlet equalization channel 302 can be oriented at a higher elevation than the outlet equalization channel 304 (shown in FIG. 4), relative to the orientation shown. Furthermore, as shown, the gate fastener 360 can be provided for securing the actuation stem 270 to the sliding gate 250 within the equalization chamber 350. In example aspects, the gate fastener 360 can extend into the sliding gate 250 at the inlet face 352 and can be positioned above the inlet equalization channel 302, relative to the orientation shown. Example aspects of the gate fastener 360 can be fixedly coupled to the sliding gate 250, but the actuation stem 270 can be configured to slide relative to the gate fastener 360 and sliding gate 250 within the equalization chamber 350, as described in further detail below.

Figure 6:
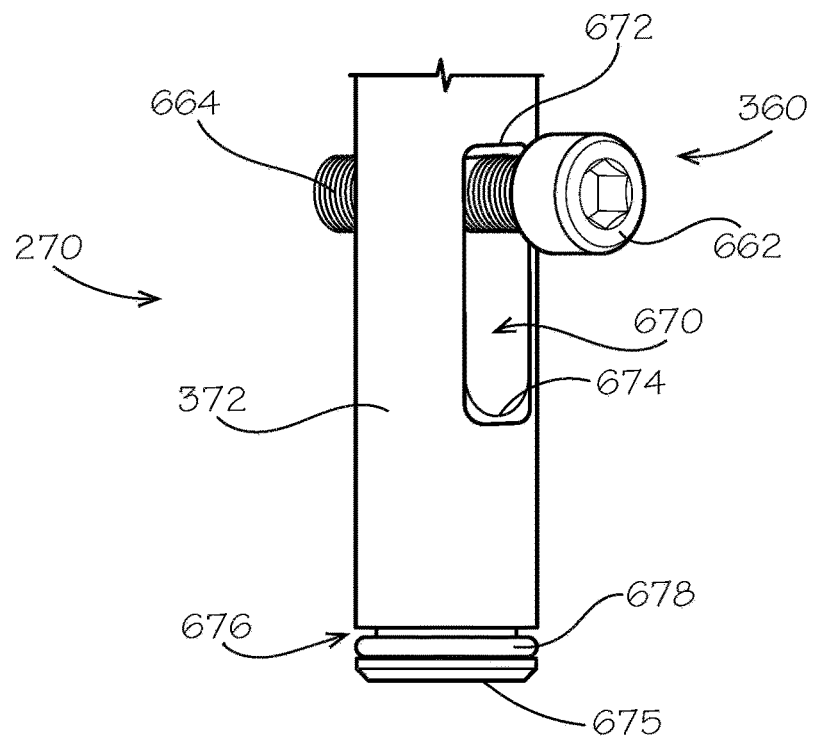
FIG. 6 is a close up view of an actuation stem of the valve assembly of FIG. 1.

FIG. 6 illustrates the lower portion 372 of the actuation stem 270 configured to be received within the equalization chamber 350 (shown in FIG. 3) of the sliding gate 250 (shown in FIG. 2). According to example aspects, as shown, the actuation stem 270 can define an elongated fastener slot 670 formed therethrough, proximate to a distal end 675 of the actuation stem 270. The elongated fastener slot 670 can generally define an upper fastener slot end 672 and a lower fastener slot end 674. Example aspects of the gate fastener 360 (e.g., the threaded bolt 362) can define a head 662 and a threaded tail 664, and the threaded tail 664 can extend through the fastener slot 670. The actuation stem 270 can slide up and down with respect to the gate fastener 360, relative to the orientation shown, while the gate fastener 360 remains engaged through the fastener slot 670, and thus, the actuation stem 270 can slide up and down with respect to the sliding gate 250. In example aspects, the gate fastener 360 can limit the movement of the actuation stem 270 relative thereto by engaging the upper fastener slot end 672 or lower fastener slot end 674 of the fastener slot 670. Thus, the movement of the actuation stem 270 relative to the gate fastener 360, and thus relative to the sliding gate 250, can be limited by a length of the fastener slot 670.

Example aspects of the actuation stem 270 can further define an annular stem groove 676 formed adjacent to the distal end 675 thereof. In the present aspect, as shown, the annular stem groove 676 can be defined between the distal end 675 and the fastener slot 670. According to example aspects, an annular stem packing 678 can be received in the annular stem groove 676. The stem packing 678 can be, for example, an O-ring, as shown. In other aspects, any other suitable type of packing can be received in the annular stem groove 676. The stem packing 678 can engage a chamber wall 750 (shown in FIG. 7) of the equalization chamber 350 to create an airtight seal between the actuation stem 270 and the chamber wall 750, preventing the flow of gas past the distal end 675 of the actuation stem 270. In other aspects, the stem groove 676 may be formed in the chamber wall 750.

Figure 7:
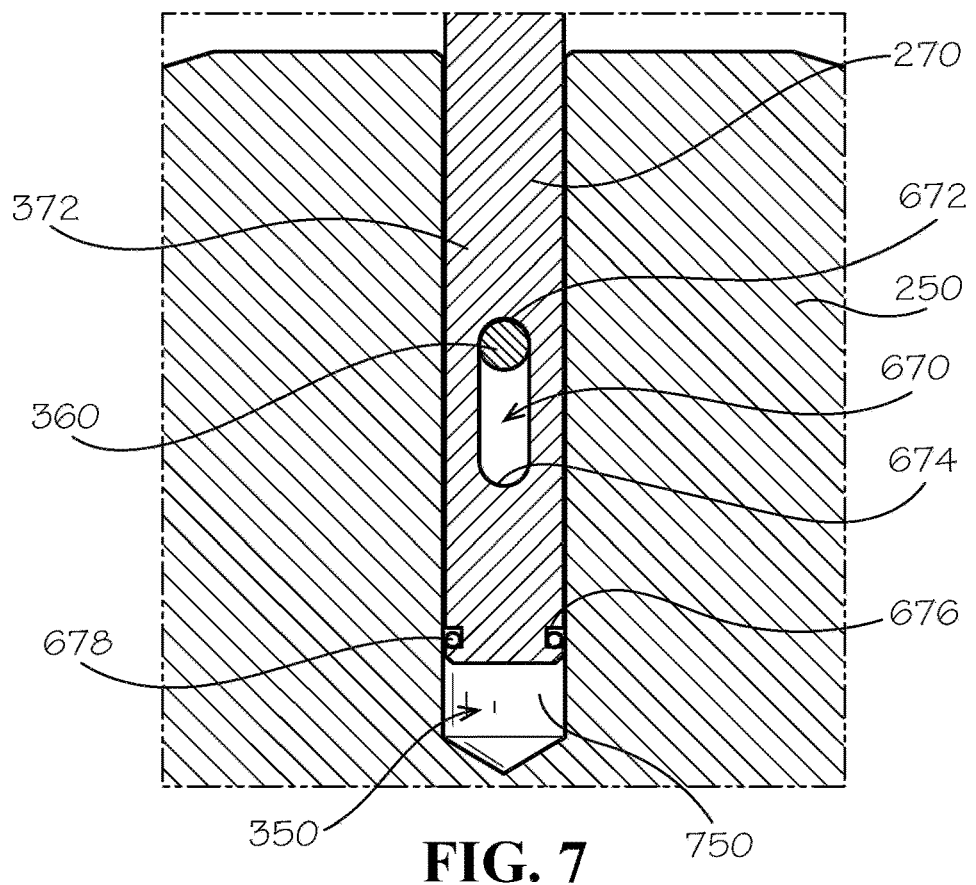
FIG. 7 is a cross-sectional view of the actuation stem of FIG. 6 coupled to the sliding gate of FIG. 4, taken along line 7-7 in FIG. 4.

FIG. 7 illustrates a cross-sectional view of the lower portion 372 of actuation stem 270 engaged with the equalization chamber 350 of the sliding gate 250, wherein the actuation stem 270 is in the first position relative to the sliding gate 250. In the first position, as shown, the actuation stem 270 can be lowered within the equalization chamber 350, such that the gate fastener 360 can be oriented proximate to the upper fastener slot end 672 of the fastener slot 670. Clearance can be provided between the gate fastener 360 and the lower fastener slot end 674 of the fastener slot 670, such that the actuation stem 270 can slide upward within the equalization chamber 350, relative to the orientation shown, to the second position (shown in FIG. 9). As shown, the stem packing 678 can be sandwiched between the annular stem groove 676 of the actuation stem 270 and the chamber wall 750 of the equalization chamber 350 to create an airtight seal therebetween. As such, gas received in the equalization chamber 350 can be prohibited from passing around the stem packing 678.

Figure 8:
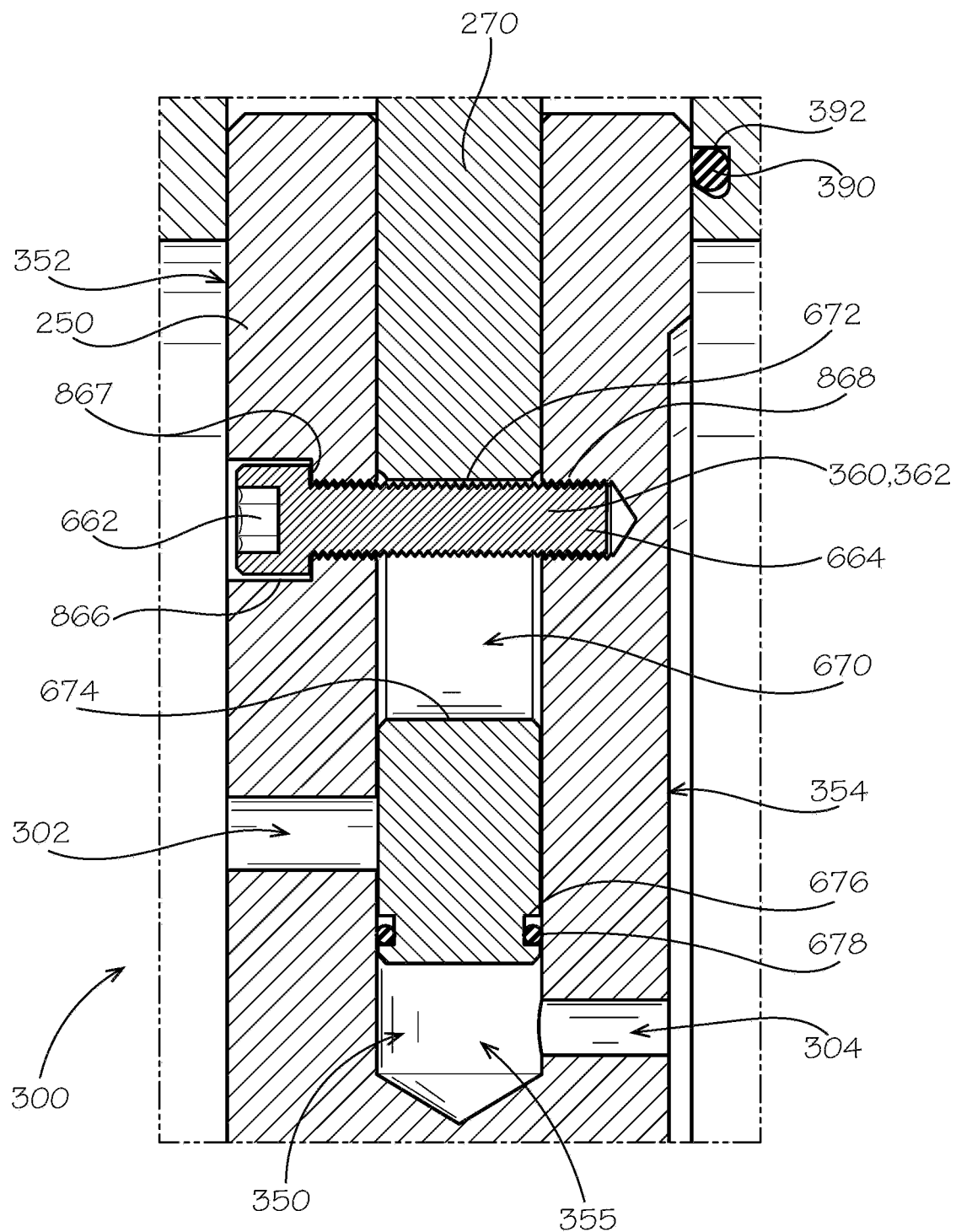
FIG. 8 is a close-up view of the equalization valve of FIG. 2 is in a closed orientation.

FIG. 8 illustrates another cross-sectional view of the actuation stem 270 engaged with the equalization chamber 350, wherein the actuation stem 270 is in the first position relative to the sliding gate 250. According to example aspects, the gate fastener 360, e.g., the threaded bolt 362, can define the head 662 and the threaded tail 664. The threaded tail 664 can extend through an inlet fastener opening 866 extending from the inlet face 352 of the sliding gate 250 to the equalization chamber 350. The threaded tail 664 can further extend across the equalization chamber 350 and into a fastener recess 868 formed in the sliding gate 250 opposite the inlet fastener opening 866. One or both of the inlet fastener opening 866 and the fastener recess 868 can be fully or partially threaded and can mate with the threaded tail 664. In some aspects, the head 662 of the gate fastener 360 can be nested within the inlet fastener opening 866, such that the gate fastener 360 can be substantially flush with the inlet face 352 of the sliding gate 250, and the head 662 can abut a shoulder 867 of the inlet fastener opening 866 to prohibit passage therethrough. In other aspects, the head 662 may not be flush with the inlet face 352. As described above, the threaded tail 664 of the gate fastener 360 can extend through the fastener slot 670 of the actuation stem 270, thereby securing the actuation stem 270 to the sliding gate 250.

An example aspect of the equalization valve 300 is shown clearly in this view, which can be configured to selectively allow or prohibit a small amount of gas to flow through the equalization pathway 355 of the sliding gate 250 in an open orientation and a closed orientation, respectively. According to example aspects, the equalization valve 300 can comprise the inlet equalization channel 302, the equalization chamber 350, and the outlet equalization channel 304. As shown, the inlet equalization channel 302 can extend from the inlet face 352 of the sliding gate 250 to the equalization chamber 350, and the outlet equalization channel 304 can extend from the outlet face 354 of the sliding gate 250 to the equalization chamber 350. The inlet equalization channel 302 can be in fluid communication with the outlet equalization channel 304 when the actuation stem 270 is moved to the second position, as shown and described in further detail below with respect to FIG. 9. According to example aspects, the inlet equalization channel 302 and outlet equalization channel 304 can substantially parallel to one another, but can be vertically offset from one another, relative to the orientation shown. That is to say, in some aspects, the inlet equalization channel 302 can be oriented a first height $H_1$ (shown in FIG. 5) along a length L (shown in FIG. 4) of the sliding gate 250, and the outlet equalization channel 304 can be oriented at a different, second height $H_2$ (shown in FIG. 4) along the length L of the sliding gate 250. For example, in the present aspect, the inlet equalization channel 302 can be oriented above the outlet equalization channel 304 (i.e., at a greater height), relative to the orientation shown, and as such, $H_1$ can be greater than $H_2$. In other aspects, however, the outlet equalization channel 304 may be oriented above the inlet equalization channel 302.

As shown, with the actuation stem 270 in the first position (e.g., lowered within the equalization chamber 350), a portion of the actuation stem 270 can block the inlet equalization channel 302 of the equalization pathway 355, preventing gas from passing into (or out of) the equalization chamber 350 through the inlet equalization channel 302. Thus, the equalization valve 300 can be in the closed orientation when the actuation stem 270 is in the first position and is preventing gas from passing through the inlet equalization channel 302. In example aspects, the portion of the actuation stem 270 blocking the inlet equalization channel 302 can be oriented between the fastener slot 670 and the annular stem groove 676. As such, in the first position, the stem packing 678 received in the annular stem groove 676 can be oriented between the inlet equalization channel 302 and the outlet equalization channel 304 to further prohibit any gas from leaking from the inlet equalization channel 302 into the equalization chamber 350 and out through the outlet equalization channel 304.

FIG. 9 illustrates a cross-sectional view of the actuation stem 270 in the second position relative to the sliding gate 250. The actuation stem 270 can be actuated by the actuator 275 (shown in FIG. 2) to raise the actuation stem 270 (e.g., slide the actuation stem 270 upward, relative to the orientation shown) within the equalization chamber 350. As the actuation stem 270 is moved to the second position, the fastener slot 670 formed through the actuation stem 270 can be slid upward, drawing the lower fastener slot end 674 of the fastener slot 670 toward the gate fastener 360, which can be fixedly coupled to the sliding gate 250. Thus, the gate fastener 360 can be oriented proximate to the lower fastener slot end 674 in the second position. The distal end 675 of the actuation stem 270 can slide past the inlet equalization channel 302 to unblock the inlet equalization channel 302 of the equalization pathway 355, allowing gas to flow through the equalization valve 300. Thus, the equalization valve 300 can be in the open orientation when the actuation stem 270 is moved to the second position. In aspects wherein the pressure at the inlet passage 315 is greater than the pressure at the outlet passage 225, gas from the inlet passage 315 can flow through the inlet equalization channel 302 and into the equalization chamber 350. The gas in the equalization chamber 350 can then flow out through the outlet equalization channel 304 into the outlet passage 225, allowing the pressure at the inlet passage 315 and outlet passage 225 to equalize or become more equal. In aspects wherein the pressure at the outlet passage 225 is greater the pressure at the inlet passage 315, the gas can flow in the reverse direction through the equalization valve 300 from the outlet passage 225 to the inlet passage 315.

The equalization valve 300 is illustrated in the fully open orientation in FIG. 9, wherein the inlet equalization channel 302 can be fully unblocked to allow for a maximum rate of gas flow through the equalization valve 300. According to example aspects, the equalization valve 300 can also be oriented in a partially open orientation. For example, in some aspects, the distal end 675 of the actuation stem 270 may not be slid fully past the inlet equalization channel 302, such that the inlet equalization channel 302 can remain partially blocked by the actuation stem 270. With the inlet equalization channel 302 partially blocked by the actuation stem 270, the rate of gas flow through the equalization valve 300 can be reduced when compared to the maximum rate of gas flow therethrough when the inlet equalization channel 302 is fully unblocked. Thus, the rate of the gas flow through the equalization valve 300 can be selectively adjusted based on the orientation of the actuation stem 270 relative to the inlet equalization channel 302. According to example aspects, to close the equalization valve 300, the actuation stem 270 can be lowered within the equalization chamber 350 (e.g., slid downward, relative to the orientation shown), sliding the distal end 675 of the actuation stem 270 back past the inlet equalization channel 302 to fully block the inlet equalization channel 302 with the actuation stem 270, preventing gas from flowing therethrough.

In example aspects, the actuation stem 270 can be raised within the equalization chamber 350 until the lower fastener slot end 674 of the fastener slot 670 engages the gate fastener 360. The engagement of the lower fastener slot end 674 with the gate fastener 360 can prohibit further withdrawal of the actuation stem 270 from the equalization chamber 350. As the actuation stem 270 is raised further relative to the valve body 200 (i.e., to a third position), the lower fastener slot end 674 can apply an upward force to the gate fastener 360, which can be fixedly coupled to the sliding gate 250. Thus, once the lower fastener slot end 674 engages the gate fastener 360, the sliding gate 250 can be raised along with the actuation stem 270 within the gate slot 335 of the valve body 200 from the lowered orientation to the raised orientation.

FIG. 10 illustrates the actuation stem 270 oriented in a third position relative to the valve body 200 and the sliding gate 250 oriented in the raised orientation. As described above, in the lowered orientation, the sliding gate 250 can seat with the valve body 200 to seal the inlet passage 315 off from the outlet passage 225, thus preventing the flow of gas through the valve channel 305 and configuring the gate valve 110 in the closed configuration. To move the sliding gate 250 to the raised orientation, the actuation stem 270 can be moved from the second position to the third position, as shown. As the actuation stem 270 moves to the third position, the lower fastener slot end 674 (shown in FIG. 11) of the actuation stem 270 can push against the gate fastener 360 (shown in FIG. 11) to force the sliding gate 250 upward, relative to the orientation shown, within the gate slot 335 (shown in FIG. 11) towards the upper gate slot end 336 (shown in FIG. 11). The sliding gate 250 can be unseated from the valve body 200 and can be lifted out of the valve channel 305, allowing gas to flow therethrough from the inlet passage 315 to the outlet passage 225, or vice versa, thus configuring the gate valve 110 in the open configuration. According to example aspects, in the raised orientation, the sliding gate 250 can be partially raised out of the valve channel 305, as shown, or can be fully raised out of the valve channel 305. With the sliding gate 250 still partially received in the valve channel 305, the rate of gas flow through the valve channel 305 can be reduced when compared to the rate of gas flow therethrough when the sliding gate 250 is fully raised. Thus, the rate of gas flow through the valve channel 305 can be selectively adjusted based on the extent to which the sliding gate 250 is raised out of the valve channel 305.

Figure 11:
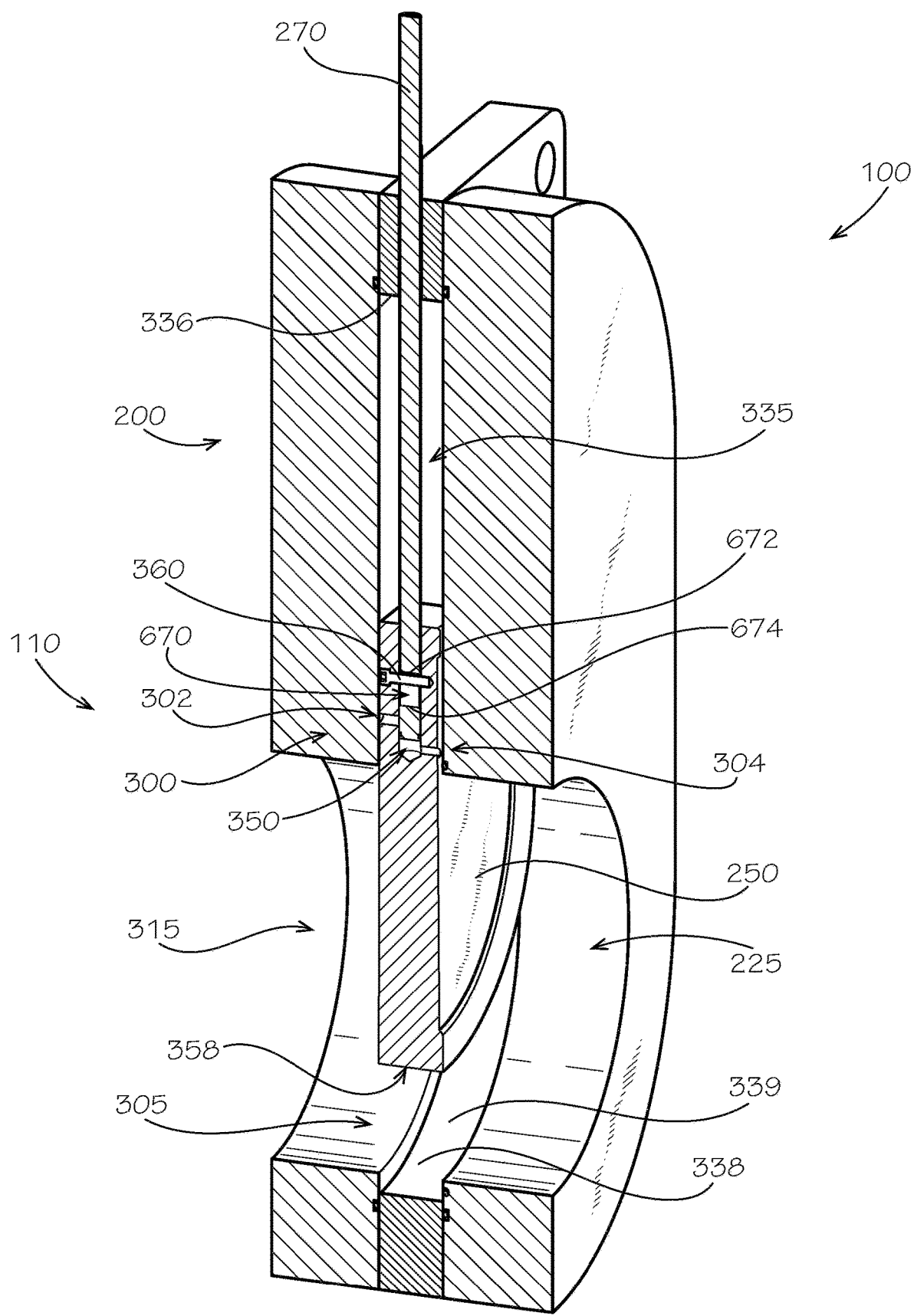
FIG. 11 is a cross-sectional view of the valve assembly of FIG. 1 taken along line 11-11 in FIG. 10.

FIG. 11 illustrates a cross-sectional view of the sliding gate 250 in the raised orientation and the gate valve 110 in the open configuration. As shown, in the open configuration, the sliding gate 250 can be drawn upward within the gate slot 335, away from the lower gate slot end 338 and towards the upper gate slot end 336. As the sliding gate 250 moves towards the upper gate slot end 336, the sliding gate 250 can be partially or fully raised out of the valve channel 305, to unblock the valve channel 305 and to allow gas to flow through the valve channel 305 from the inlet passage 315 to the outlet passage 225, or vice versa. In the present aspect, to return the gate valve 110 to the closed configuration, the equalization valve 300 can first be closed. As shown, the actuation stem 270 can be lowered within the equalization chamber 350 until the gate fastener 360 abuts the upper fastener slot end 672 thereof, preventing the actuation stem 270 from advancing further into the equalization chamber 350. When the actuation stem 270 is lowered in the equalization chamber 350, the actuation stem 270 can block the inlet equalization channel 302, thus preventing gas from flowing through the equalization valve 300. As the actuation stem 270 is lowered further with respect the valve body 200, the upper fastener slot end 672 of the actuation stem 270 can apply a downward force to the gate fastener 360, which can be fixedly coupled to the sliding gate 250. Thus, once the upper fastener slot end 672 engages the gate fastener 360, the sliding gate 250 can be lowered along with the actuation stem 270 within the gate slot 335 of the valve body 200 from the raised orientation to the lowered orientation, thereby returning the gate valve 110 to the closed configuration.

As such, a method of operating the valve assembly 100 can comprise providing the valve assembly 100 comprising the valve body 200, the gate 250, and the actuation stem 270 coupled to the gate 250, wherein the valve body 200 can define the valve channel 305 and the gate slot 335, and the gate 250 can define the equalization pathway 355. The method can further comprise moving the actuation stem 270 from the first position to the second position within the equalization chamber 350 of the gate 250, wherein, in the first position, the equalization pathway 355 can be blocked by the actuation stem 270, and in the second position, the equalization pathway 355 can be unblocked. Example aspects of the method can further comprise moving the actuation stem 270 from the second position to a third position relative to the valve body 200, wherein, in the second position, the gate 250 is in a lowered orientation within the gate slot 335 and the valve channel 305 is blocked by the gate 250, and in the third position, the gate 250 is in a raised orientation within the gate slot 335 and the valve channel 305 is unblocked.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. An equalization valve comprising:
   a valve body defining a gate slot;
   a gate defining an equalization chamber, a first equalization channel, and a second equalization channel, the equalization chamber and the first and second equalization channels defining an equalization pathway across the gate; and an actuation stem slidable within the equalization chamber between a first chamber position, wherein the actuation stem blocks the equalization pathway, and a second chamber position, wherein the actuation stem unblocks the equalization pathway;

wherein:
the actuation stem is further slidable within the gate slot of the valve body between a first valve position, wherein the gate is seated with the valve body, and a second valve position, wherein the gate is unseated from the valve body;

the actuation stem defines a lower portion slidably engaged with the equalization chamber;

the lower portion of the actuation stem defines a stem slot;

a fastener extends axially across the equalization chamber and is slidably received through the stem slot; and the stem slot is configured to slide relative to the fastener as the actuation stem slides between the first chamber position and the second chamber position.

2. The equalization valve of claim 1, wherein the first equalization channel is radially offset from the second equalization channel, such that the first equalization channel is oriented at a first height along a length of the gate and the second equalization channel is oriented at a second height along the length of the gate, the second height different from the first height.

3. The equalization valve of claim 1, wherein the gate is slidably received within the gate slot, and wherein:
the gate slot defines a first gate slot end and a second gate slot end;
the gate is configured to seat with the first gate slot end in the first valve position; and
the gate is unseated from the first gate slot end and moved towards the second gate slot end in the second valve position.

4. The equalization valve of claim 3, wherein:
the valve body comprises an inlet body, an outlet body, and a central body between the inlet body and the outlet body;
the inlet body defines an inlet passage and the outlet body defines an outlet passage;
the gate slot is defined in the central body; and
the gate seals the inlet passage off from the outlet passage in the first valve position.

5. The equalization valve of claim 4, wherein, in the first valve position, a gate seating surface of the gate is configured to seat with a slot seating surface of the gate slot, an inlet seating portion of the gate is configured to seat with the inlet body, and an outlet seating portion of the gate is configured to seat with the outlet body.

6. The equalization valve of claim 1, wherein the gate defines a first face, a second face, and a sidewall extending between the first face and second face, the equalization chamber extending into the sidewall, the first equalization channel extending from the first face to the equalization chamber, and the second equalization channel extending from the second face to the equalization chamber.

7. The equalization valve of claim 6, wherein:
the lower portion of the actuation stem defines an annular stem groove adjacent to a distal end thereof;
an annular stem packing is received in the annular stem groove; and the annular stem packing engages a chamber wall of the equalization chamber to create an airtight seal between the actuation stem and the chamber wall.

8. The equalization valve of claim 6, wherein:
the stem slot defines a first slot end and a second slot end;
the fastener is disposed proximate to the second slot end in the first chamber position; and
the fastener is disposed proximate to the first slot end in the second chamber position.

9. The equalization valve of claim 8, wherein:
the first slot end engages a first side of the fastener when the actuation stem slides from the first valve position to the second valve position; and
the second slot end engages a second side of the fastener opposite the first side when the actuation stem slides from the second valve position to the first valve position.

10. The equalization valve of claim 8, wherein the fastener is received through a fastener opening formed in one of the first face and the second face.

11. The equalization valve of claim 10, wherein the fastener further engages a fastener recess in communication with the equalization chamber and disposed opposite the fastener opening.

12. A method of operating a valve assembly comprising:
providing the valve assembly comprising a valve body, a gate, and an actuation stem coupled to the gate, the valve body defining a gate slot, the gate defining an equalization pathway;

moving the actuation stem from a first chamber position to a second chamber position within an equalization chamber of the gate, wherein, in the first chamber position, the equalization pathway is blocked by the actuation stem, and in the second chamber position, the equalization pathway is unblocked; and moving the actuation stem from a first valve position to a second valve position within the gate slot, wherein, in the first valve position, the gate is seated with the valve body, and in the second valve position, the gate is unseated from the valve body;

wherein:
the actuation stem defines a stem slot;
a fastener extends axially across the equalization chamber and is slidably received through the stem slot; and
moving the actuation stem from the first chamber position to the second chamber position comprises sliding the stem slot relative to the fastener.

13. The method of claim 12, wherein, in the first valve position, the gate is seated with a first gate slot end of the gate slot, and in the second valve position, the gate is unseated from the first gate slot end and repositioned within the gate slot.

14. The method of claim 12, wherein moving the actuation stem from the first valve position to the second valve position comprises engaging the fastener with a first slot end of the stem slot and pushing the fastener upward within the gate slot.

15. The method of claim 12, wherein:
the gate defines a first face, a second face, and a gate sidewall between the first face and second face;
the equalization pathway comprises a first equalization channel, a second equalization channel, and the equalization chamber;
the equalization chamber extends into the gate sidewall; and the first equalization channel extends from the first face to the equalization chamber and the second equalization channel extends from the second face to the equalization chamber.

16. The method of claim 15, wherein the actuation stem blocks the first equalization channel in the first chamber position to prevent a flow of one of a gas and a fluid therethrough, and the actuation stem unblocks the first equalization channel in the second chamber position to allow the flow of the one of the gas and the fluid therethrough.

17. An equalization valve comprising:
a valve body defining a gate slot;
a gate defining an equalization chamber, a first equalization channel, and a second equalization channel, the equalization chamber and the first and second equalization channels defining an equalization pathway across the gate; and
an actuation stem slidable within the equalization chamber between a first chamber position, wherein the actuation stem blocks the equalization pathway, and a second chamber position, wherein the actuation stem unblocks the equalization pathway;
wherein:
the actuation stem is further slidable within the gate slot of the valve body between a first valve position, wherein the gate is seated with the valve body, and a second valve position, wherein the gate is unseated from the valve body;
the gate is slidably received within the gate slot;
the gate slot defines a first gate slot end and a second gate slot end;
the gate is configured to seat with the first gate slot end in the first valve position;
the gate is unseated from the first gate slot end and moved towards the second gate slot end in the second valve position;
the valve body comprises an inlet body, an outlet body, and a central body between the inlet body and the outlet body;
the inlet body defines an inlet passage and the outlet body defines an outlet passage;
the gate slot is defined in the central body;
the gate seals the inlet passage off from the outlet passage in the first valve position; and
in the first valve position, a gate seating surface of the gate is configured to seat with a slot seating surface of the gate slot, an inlet seating portion of the gate is configured to seat with the inlet body, and an outlet seating portion of the gate is configured to seat with the outlet body.

* * * * *